(12) United States Patent
De Diego Rodrigo et al.

(10) Patent No.: US 9,041,362 B2
(45) Date of Patent: May 26, 2015

(54) SYSTEM FOR ELIMINATING CURRENT SURGES IN ELECTRONIC SYSTEMS AND EQUIPMENT HAVING INTERMITTENT CURRENT CONSUMPTION

(75) Inventors: Jose Miguel De Diego Rodrigo, Leioca (ES); Jose Ignacio Garate Añibarro, Leiova (ES)

(73) Assignee: UNIVERSIDAD DEL PAIS VASCO—EUSKAL HERRIKO UNIBERTSITATEA (ES)

( * ) Notice: Subject to any disclaimer, the term of this patent is extended or adjusted under 35 U.S.C. 154(b) by 283 days.

(21) Appl. No.: 13/583,657

(22) PCT Filed: Mar. 9, 2011

(86) PCT No.: PCT/ES2011/070155
§ 371 (c)(1),
(2), (4) Date: Oct. 18, 2012

(87) PCT Pub. No.: WO2011/110718
PCT Pub. Date: Sep. 15, 2011

(65) Prior Publication Data
US 2013/0027005 A1 Jan. 31, 2013

(30) Foreign Application Priority Data
Mar. 9, 2010 (ES) .................................. 201030338

(51) Int. Cl.
*H02M 3/158* (2006.01)
*H04B 15/00* (2006.01)

(52) U.S. Cl.
CPC ........ *H04B 15/005* (2013.01); *H04B 2215/061* (2013.01)

(58) Field of Classification Search
USPC .......................... 323/222, 266, 271, 282–287; 363/16–20, 56.01, 59, 60, 72, 73, 74, 363/76
See application file for complete search history.

(56) References Cited

U.S. PATENT DOCUMENTS 5,796,182 A * 8/1998 Martin ............................ 307/66
6,094,036 A * 7/2000 Rampold ...................... 323/266
(Continued)

FOREIGN PATENT DOCUMENTS

WO 02103729 A2 12/2002
WO 2007102689 A1 9/2007

OTHER PUBLICATIONS

International Search Report; International Application No. PCT/ES2011/070155; International Application Filing Date Mar. 9, 2011; Mail date Jul. 29, 2011.

*Primary Examiner* — Rajnikant Patel
(74) *Attorney, Agent, or Firm* — Cantor Colburn LLP

(57) ABSTRACT

The invention relates to a system for eliminating current surges that includes a first voltage regulator (7) having a current limit programmable to a value ($I_{(limit)}$) that depends on the value of the intermittent current surges ($I_{O(surge)}$) required by the intermittent load (3) and the relationship thereof to the work cycle, a second voltage regulator (9), a condenser (4) connected between the first and second regulators (7, 9), that loads when the current is no longer required and that unloads when there is a need for output current to provide current to the second regulator (9) which absorbs the changes in voltage produced by the loading/unloading of the condenser and provides a constant voltage for any value of the required output current surge, independently of voltage changes in the condenser (4), and a control loop between a sensor for the output current provided to the load and an input limit (15) for the input current ($I_I$) in the first regulator (7).

Thus, the input current ($I_{(limit)}$) (1) and the output voltage ($V_{Load}$) are constant for any value of the output current surge ($I_{O(surge)}$).

7 Claims, 2 Drawing Sheets

(56) References Cited

U.S. PATENT DOCUMENTS

| | | | |
|---|---|---|---|
| 6,798,177 B1* | 9/2004 | Liu et al. | 323/222 |
| 6,812,586 B2* | 11/2004 | Wacknov et al. | 290/52 |
| 7,188,591 B2* | 3/2007 | Long | 123/90.11 |
| 7,973,543 B2* | 7/2011 | Andoh et al. | 324/713 |
| 2008/0293426 A1 | 11/2008 | Kim et al. | |

\* cited by examiner

SYSTEM FOR ELIMINATING CURRENT SURGES IN ELECTRONIC SYSTEMS AND EQUIPMENT HAVING INTERMITTENT CURRENT CONSUMPTION

TECHNICAL FIELD OF THE INVENTION

The present invention relates to the technical field of electronic technology and applies to the embodiment and design of power systems for electronic equipment, being particularly applicable to telecommunications systems based on the intermittent transmission of information, such as GSM, GPRS or UMTS. The equipment where the invention can be applied includes that which presents an intermittent consumption pattern, such as mobile phones, control modules, data acquisition modules, remote sensors, fixed cell terminals, base stations, etc.

BACKGROUND OF THE INVENTION

A sizeable number of electronic systems and equipment, such as the GSM Global System for Mobile Communications have a pulsed current characteristic as a result of the fact that the load they present is intermittent. The frequency of the pulse of current generated by the load is normally low frequency.

Current surges produced by pulsed current consumption translate, on electronic equipment or systems, into different phenomena. These phenomena must be overcome in order to achieve the equipment's correct functioning, within the specifications and requirements of applicable standards. The technical challenges faced in this regard are:

Transient voltage dips in the power system. Current surges, together with the total resistance of all conductor elements, situated between the power source and the intermittent load, produce instantaneous dips in the supply voltage. These voltage dips can be considered a ripple in the supply voltage.

Current pathways must be designed with conductor sections based on maximum current surge specifications instead of their mean value, which likewise applies to the components and devices in the current's path.

According to the state of the art, the disadvantages presented by intermittent surges in consumption can be avoided, partially, using techniques based on the use of condensers, LC networks, fixed load current limitation, as well as by fixed load current limitation and constant output voltage, The solution by means of a condenser uses the latter's capacity to store the instantaneous energy required by the intermittent load. The condenser is sized according to the required power, the repetition period and duration thereof or work cycle. This technique is very widespread due to its simplicity although it presents several drawbacks:

The value of the necessary capacitor is, in most applications, high meaning that the size of condenser required is significant and not physically viable.

There is an output ripple, a sum of the voltage change for capacitor loading/unloading and the condenser's equivalent series resistance, The current in the input is intermittent At the same time, the solution by means of LC filtering is based on the use of a high value inductance between the input and output next to a condenser in parallel with the output. This technique is used in some industrial applications. In LC filtering, the inductance limits the condenser load current. Whenever there is a current requirement in the electronic system or device, the condenser starts to unload, meanwhile the inductance limits the pumping of input current, which gradually increases depending on the time that the current surge lasts at the output, partly provided by the condenser. When the requirement for current in the output ends, the inductance continues to provide power to the condenser, loading it, at the same time increasing the voltage. One of the drawbacks of this solution is the existence of overvoltages in the output and the appearance of a ripple in voltage greater than the one that would appear in a system with current control. Another drawback is that, in order for the LC filter to function, the values of the inductance and the condenser must be high. In certain applications, the physical dimensions of the components make it unviable.

The solution by means of fixed load current limitation is based on loading a condenser through a voltage regulator with a current limit. The maximum current of the voltage regulator is limited to a fixed level the magnitude of which is the mean value of the maximum current surge consumed by the intermittent load. The advantage of this solution is that the input current corresponds to the mean value of the maximum output current surge and at that work point its value is constant. Nonetheless, it must also be said that the drawbacks of this solution are that the output voltage always presents a ripple proportional to the change in voltage due to the loading of the condenser at constant current and unloading at the current surge required at the output, and that, if the output current surge declines, intermittent consumption reappears at the input, although in this case it has a lower value.

If another regulator is added at the output to the fixed load current limitation system, in this case without current limit, an output voltage that remains constant is achieved for any current surge through loading. The second conversion element absorbs fluctuations in the supply voltage produced by the loading and unloading of the condenser and its purpose is to eliminate rippling at the condenser terminals. The advantage of this solution is that it achieves for the maximum output current surge the input current and output voltage remaining constant, but the drawback of this solution is that for values lower than the output current surge, since the capacitor reloads in less time, intermittences appear in the input current.

In the state of the art, there are methods and systems used to reduce power consumption in intermittent consumption devices, such as mobile telephones described for example, in patent applications US-2008293426-A1, US-2008293426-A1 and WO-2007102689-A1 which, however, are focused on reducing consumption, meaning that they do not represent solutions to the drawbacks described above.

In the face of the drawbacks in the state of the art it was advantageous to develop a system that overcame the unfavourable phenomena previously described, due to the intermittent consumption of the electronic systems or equipment and that, therefore, prevented intermittent current consumption at the input terminals, eliminated voltage dips at the output of the power system, and eliminated or at least reduced the level of electromagnetic interferences generated by intermittent consumption.

DESCRIPTION OF THE INVENTION

The purpose of the present invention is to overcome the drawbacks of the systems of the state of the art described above by means of a system for eliminating current surges for electronic systems and equipment with intermittent current consumption, comprising a power input through which input current circulates, and a power output through which the output current required for an intermittent load circulates;

a first voltage regulator having a programmable current limit, and a second voltage regulator connected between the current input and the current output;

a hold capacitor connected between the first voltage regulator and the second voltage regulator, the condenser being sized to hold energy when there is no requirement for output current and to unload current when there is a requirement for output current;

a current sensor connected between the second voltage regulator and the current output, to measure output current requirements;

the first voltage regulator being additionally connected to an input current limit and to an output connected to the condenser through which it supplies load current to the condenser; and the second current regulator being designed so as to maintain the output voltage provided to the intermittent load constant;

the system being characterised in that the sensor measures the required output current and is connected to a current analyser;

the current analyser detects a maximum value of the required output current, and establishes a mean value of the required output current which it transmits to the first voltage regulator through the input current limit, the mean value constituting a programmed current limit value;

the first voltage regulator establishes the condenser load current based on the programmed current limit value, independently of voltage changes in the condenser terminals provided to the second voltage regulator device and independently of the required output current;

the measurement of the maximum value of required output current by the current analyser and the measurement of the required output current are synchronised through the control signal of a load control system that controls the loading of the intermittent load and makes the latter have an intermittent behaviour.

According to the invention, the first voltage regulator can be a linear or switched-mode DC-DC voltage converter. In turn, the second voltage regulator can also be a linear or switched-mode DC-DC voltage converter. The reasoning that follows refers to the case of linear converters. The same idea is applicable to switched-mode converters taking into account the power ratios.

$$P_O = \eta \times P_I O \, V_O \times I_O = \eta \times V_I \times I_I (\eta = \text{performance}).$$

With the measurement of the output current surge provided to the intermittent load, $I_{O(surge)}$, and the aid of a voltage regulator with programmable output current, the output current of the first voltage regulator is limited to the mean value as shown in the following equation:

$$I_{I(load)} = I_{O(surge)} * \text{Work Cycle}$$

wherein $I_{I(load)}$ is the input current that corresponds to the programmed current limit;

$I_{O(surge)}$ is the output current surge

Work Cycle is the ratio between active time ($t_{unload}$) an the repetition period of the intermittent load consumption (T)

$$I_C = C \cdot \frac{dV_C}{dt}, \text{ since } I_C = Cte., \Rightarrow I_C \cdot \Delta t = C \cdot \Delta V_C$$

-continued $$\left. \begin{array}{l} \Delta V_{unload} = \frac{(I_{O(surge)} - I_{I(load)}) \cdot t_{unload}}{C} \\ \Delta V_{load} = \frac{I_{I(load)} \cdot t_{load}}{C} \end{array} \right\} \Delta V_{unload} = \Delta V_{load} \Rightarrow$$

Input current continuity $\Rightarrow T = t_{load} + t_{unload}$ $$I_{I(load)} = I_{O(surge)} \cdot \frac{t_{unload}}{T}$$

In this way the input current, $I_{I(load)}$, is always constant, independently of the value of the output current surge, $I_{O(surge)}$.

As can be seen, the present invention achieves a continuous current consumption at the current input of a circuit wherein output current surges of varying amplitude appear and without the appearance of voltage ripple at the current output. This is achieved by means of the first voltage regulator having a current limit to a value that depends on the value of the intermittent current surge required by the current output and the relationship thereof to the work cycle, the condenser connected between the first and second voltage regulator, that loads when the current is no longer required and that unloads when there is a need for output current to provide current to the second voltage regulator, the second voltage regulator which absorbs the voltage changes produced by the loading/unloading of the condenser and provides a constant voltage for any value of the required output current surge and independently of voltage changes in the condenser, and the control loop between the measurement of the output current provided to the load and the input limit for the input current in the first voltage regulator enabling, once the work cycle of the intermittent load and value of the output current surge is known, the programming of the current limit for loading the condenser until the next current surge arrives.

Therefore, the invention solves several problems inherent to formerly known systems, namely:

It prevents the appearance of electromagnetic fields in the system, caused by intermittent current flows in the input.

The embodiment of the invention is simple and requires minimum electronics and programming and, also, it can be embodied in an integrated circuit.

By avoiding current surges consumed by intermittent loads that force connecting elements to be oversized for the surge value, the system according to the present invention reduce this need to just the mean value of current consumed.

By preventing, as intermittent current is made to pass through the resistance connected to the equipment's power source, the occurrence of voltage dips that can spread throughout the entire system and that can disturb the normal functioning of the equipment and achieving the current to be continuous, the invention manages to make these voltage dips disappear.

The invention has a wide range of applications given that it is applicable to any electronic system or equipment having intermittent consumption. It is presented as an improvement on regulated or unregulated power supply systems which are nowadays used on all electronic equipment.

Electronic systems or equipment presenting intermittent consumption generate problems with functioning and operability on two fronts which, however, are overcome by means of the present invention. Thus, with regards to the energy source, through application of the invention, the current that circulates in the input is constant and its value, since it is limited to the mean value instead of the maximum surge, reduces requirements in respect of the sizing of connecting elements. At the same time, with regards to the load, by providing a stable voltage, independently of the instantaneous current requirements, the application of the invention allows a ripple-free power supply at the frequency of the load's intermittence.

In accordance with all that can be inferred from the description above, the present invention can be applied to any system needing to solve these problems simultaneously. Thus, the most immediate example of application is in communication systems based on intermittent transmission such as GSM, GPRS, UMTS, etc. Therefore, the system according to the present invention is applicable, for example, on mobile telephone systems, data modules, fixed cell terminals, base stations, etc. In these systems, the work cycle is known and constant, as well as the amplitude of the current consumption. Nonetheless, the present invention is also applicable to any system having an intermittent current requirement in which the width of the current pulse is known or the time of application of the load and the repetition period thereof, the invention can be applied in such a way that the consumption in the input is maintained constant and its value corresponds to the equivalent of the mean power provided to the load.

BRIEF DESCRIPTION OF THE DRAWINGS

Next aspects and embodiments of the invention are described on the basis of drawings wherein.

Figure 1:
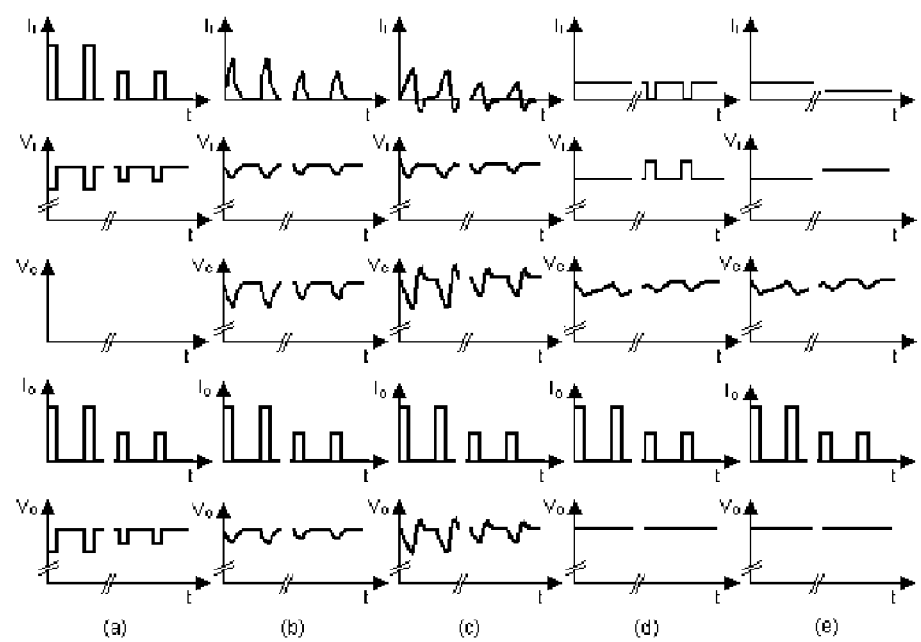
FIG. 1 shows the wave forms for two situations, full load and half load, for techniques used to avoid the effects of intermittent consumption surges according to the state of the art (columns (a)-(d)) and according to the system of the present invention (column e))
Figure 2:
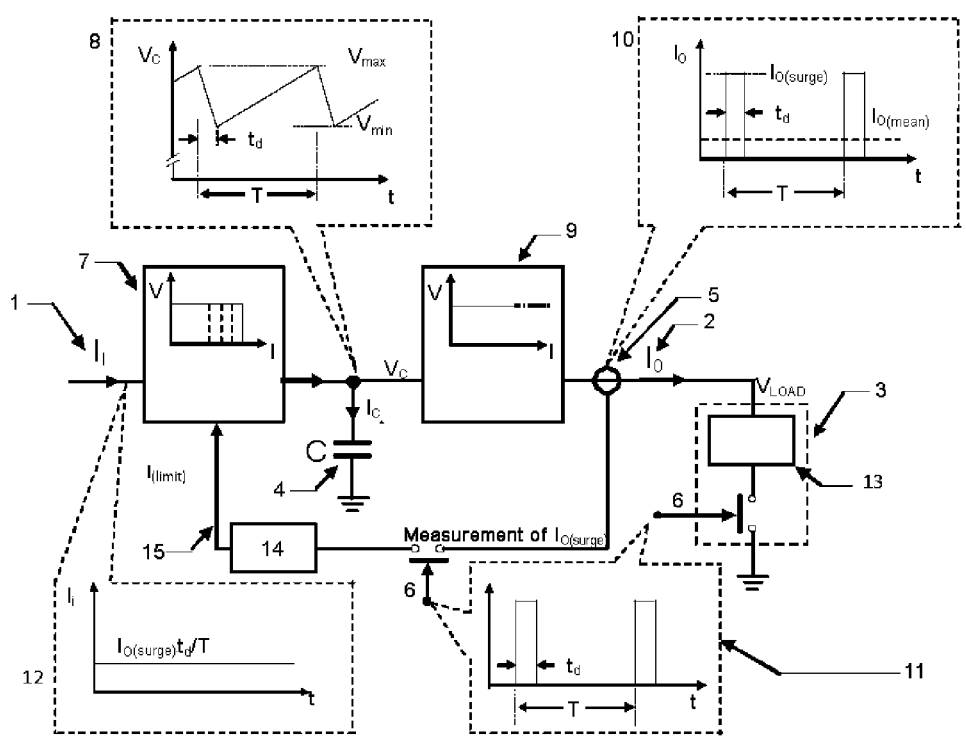
FIG. 2 shows the functional diagram of a practical embodiment of the system of the present invention.

Numerical references appear on these figures to identify the following elements:
1 current input
2 current output
3 intermittent load
4 hold capacitor
5 current sensor
6 intermittent load control signal
7 first voltage regulator
8 output voltage of the first regulator and/or ripple in the capacitor
9 second voltage regulator
10 intermittent output wave form
11 evolution over time of the load activation signal
12 input current form corresponding to the mean value
13 load
14 current analyser
15 input current limit of the first regulator
$I_C$ condenser load current
$I_I$ input current
$I_{(limit)}$ programmed current limit value
$I_O$ output current
$I_{O(mean)}$ mean current required for loading of the intermittent load
$I_{O(surge)}$ maximum value of current consumption required by the load
$I_{O(surge)}t_d/T$ mean value of the output current required for loading of the intermittent load
$V_C$ output voltage of the first regulator and/or voltage in the condenser
$V_{Load}$ output voltage of the second regulator that is provided to the intermittent load Modes Of Embodiment Of The Invention What follows is a description of FIGS. 1 and 2. The figures relate expressly to an embodiment of the aforesaid invention that is presented as an illustrative non-limiting example thereof.

FIG. 1 shows the wave forms for two situations, full load and half load, with the techniques used to overcome the effects of intermittent surges in consumption. In FIG. 1, the represented signals are as follows:
The represented signals are:
The input current $I_I$
The input voltage $V_I$ (assuming there is a certain internal resistance in the power source)
The evolution of voltage in the hold capacitor $V_0$ (if it exists).
The current for the output load $I_0$ (intermittent consumption).
The output voltage at the load terminals $V_0$.
Columns (a)-(e) of FIG. 1 correspond to the signals in the following systems:
(a) Direct connection
(b) With a capacitor on the load
(c) Through an LC network
(d) With fixed current limitation and constant output voltage
(e) System according to the present invention The left hand side of each graph shows the wave forms of the currents and voltages for maximum consumption surges, whereas the right hand side of each graph shows the wave forms of the currents and voltages for a lower output current in the same work cycle. It is important to highlight that in the graph of column (e), corresponding to the system according to the present invention, the input current, $I_I$, is continuous and is adjusted to the mean value of the output current, $I_O$.

As can be observed, in FIG. 1, in a conventional direct connection of the type that corresponds to column (a), current surges, together with the total resistance of conductor elements situated between the power source and the intermittent load, produce instantaneous dips in the supply voltage which can be considered ripples in the supply voltage.

In the solution that uses a condenser's capacity to hold the instantaneous energy required by the intermittent load wherein the wave forms are shown in column (b), there is an output ripple, as the sum of the change in voltage due to the loading/unloading of the capacitor and equivalent series resistance of the condenser, and the current in the input is intermittent.

With regards to the solution by means of LC filtering, column (c) shows the existence of overvoltages in the output and the appearance of a ripple in voltage that is even greater than the one that appears in a system having current control.

Finally and in respect of the system with fixed current limit and constant output voltage, column (d) shows that for lower values of the output current surge, since the capacitor reloads in less time, intermittences appear in the input current.

As inferred from the comparison of the signals on the graphs that appear in the columns of FIG. 1, the system of the present invention (column (e)) lacks the disadvantages of the systems of the state of the art corresponding to columns (a)-(d).

FIG. 2 shows a functional diagram of a practical embodiment of the system, with linear regulators, according to the present invention and the wave forms of the most relevant signals of the invention corresponding to an embodiment thereof, and represents a power supply system with input current $-I_I-$ corresponding to a mean value of the output current consumption $-I_O-$ for the load presented by the intermittent load -3- and with regulated output voltage $-V_{Load}-$.

One can see that the system comprises a power input -1- through which input current $-I_I-$ circulates, and a power output -2- through which output current $-I_0-$circulates towards the intermittent load -3-. Between the power input -1- and the power output -2- there is a connection between a first voltage regulator -7- having a programmable current limit connected to the input current -1- and a second voltage regulator -9- connected to the power output to the intermittent load -2-, a hold -4- capacitor -4- connected between the first voltage regulator -7- and the second voltage regulator -9-, as well as a current sensor -5- connected between the second voltage regulator -9- and the power output to the intermittent load The first voltage regulator -7- is a first DC-DC voltage converter, having an input current limit -15-, and having an output connected to the condenser -4- through which it supplies a load current $-I_C-$ to the condenser -4-.

The condenser -4- is sized to hold energy during the inactive period when there is no current consumption through the current output -2-. The load current $-I_C-$ of the condenser -4-, corresponds to the mean current $-I_{O(mean)}-$ required by the load -13- of the intermittent load -3- through the current output -2- towards the intermittent load -3-. The voltage in the terminals of the condenser -4- is provided to the second voltage regulator -9-.

The second voltage regulator -9- is a second DC-DC voltage converter. The function of the second voltage regulator -9- is to maintain constant the output voltage $-V_{Load}-$ that is provided to the intermittent load -3-, independently of voltage changes in the condenser terminals -4- and independently of the output current $-I_O-$ required for the load -13- of the intermittent load -3- through the output -2-.

The sensor -5- measures the output current $-I_O-$ consumed in the load -13- and is connected to a current analyser -14-. Since the output current $-I_O-$ is intermittent according to the load -13- requested by the intermittent load -3-, it presents an intermittent wave form -10-. The current analyser -14- detects the maximum value of current consumption $-I_{O(surge)}-$ required by the load -13- and establishes a mean value $-I_{O(surge)}t_d/T-$ of the output current $-I_O-$ which constitutes a programmed current limit value $-I_{limit}-$ that the current analyser -14- transmits to the first voltage regulator -7- through the current programming input -15-.

The measurement of the maximum value of current consumption $-I_{O(surge)}-$ and the consumption required for load -13- of the intermittent load in the output -2- are synchronised through a control signal -6- of a load control system -11- which controls the load operation -13- of the intermittent load -3- and makes it have an intermittent behaviour.

Given that the current limit -15- is programmable and that its value corresponds to the mean value $-I_{O(surge)}t_d/T-$ of the output current $-I_O-$ in the intermittent requirements of the intermittent load through the current output -2-, and given that the output voltage $-V_C-$ of the DC-DC converter -7-, upon entry of the current limit, has a ripple -8- due to loading and unloading of the hold capacitor -4-, one achieves the output voltage $-V_{Load}-$ being constant although the consumption is intermittent -10-, at the same time as the input current $-I_I-$ that enters the first voltage regulator -7- does not correspond to the maximum value of current consumption $-I_{O(surge)}-$ required by the load -13- but is limited to the constant programmed current limit value $-I_{(limit)}-$, corresponding to the mean value $-I_{O(surge)}t_d/T-$ of the output current $-I_O-$ required by the load -13- of the intermittent load -3-.

As may be inferred from the foregoing, the system according to the present invention makes it possible to close a control loop between the measurement of the output current $-I_O-$ provided to the load -13- and the current limit of the first voltage regulator -7-, in such a way that intermittent current consumption at the input terminals is prevented, voltage dips in the power supply system output are eliminated and the level of electromagnetic interferences generated by intermittent consumption is eliminated or at least reduced.

The invention claimed is:

1. System for eliminating current surges for electronic systems and equipment having intermittent current consumption, comprising
    a current input through which input current enters, and a current output through which output current (Io) exits as required by the intermittent load through the current output;
    a first voltage regulator having a current limit, and a second voltage regulator connected between the current input and the current output;
    a hold capacitor connected between the first voltage regulator and the second voltage regulator, the condenser being sized to hold energy when there is no requirement for output current and to unload current when there is a requirement for output current;
    a current sensor connected between the second current regulator and the current output, for measuring output current requirements;
    the first voltage regulator being additionally connected to an input current limit and to an output connected to the condenser through which it supplies a load current to the condenser; and the second current regulator being designed to maintain constant the output voltage ($V_{Load}$) that is provided to the intermittent load;
    wherein
    the sensor measures the output current required and is connected to a current analyser;
    the current analyser detects a maximum value of the required output current, and establishes a mean value of the required output current which it transmits to the first voltage regulator through the input current limit, the mean value constituting a programmed current limit value;
    the first voltage regulator establishes the load current of the condenser according to the programmed current limit value, independently of voltage changes in the terminals of the condenser provided to the second voltage regulator device and independently of the required output current;
    the measurement of the maximum value ($_{IO(surge)}$) of the required output current by the current analyser and the measurement of the required output current are synchronised through a control signal from a load control system that controls the load of the intermittent load and makes it have an intermittent behaviour.

2. System for eliminating current surges, according to claim 1, wherein the first voltage regulator is a DC-DC voltage converter.

3. System for eliminating current surges, according to claim 1, wherein the second voltage regulator is a DC-DC voltage converter.

4. System for eliminating current surges, according to claim 2, wherein the second voltage regulator is a DC-DC voltage converter.

5. System for eliminating current surges according to claim 1, wherein in the system is configured to close a control loop between a measurement of the output current ($I_O$) provided to a load and the current limit of the first voltage regulator.

6. System for eliminating current surges according to claim 1, wherein the input current ($I_{I(load)}$) is always constant, independently of the value of the output surge $I_{O(surge)}$).

7. System for eliminating current surges according to claim 1, wherein the second voltage regulator is configured to maintain constant the output voltage ($V_{Load}$) that is provided to the intermittent load, independently of voltage changes in the terminals of the condenser and independently of the output current ($I_O$) required for a load of the intermittent load through the output.

* * * * *